United States Patent [19]

Okuno et al.

[11] 4,053,912
[45] Oct. 11, 1977

[54] VIEW FINDER SYSTEM FOR A SINGLE LENS REFLEX CAMERA

[75] Inventors: Youichi Okuno, Yokohama; Hideo Yokota, Tokyo, both of Japan

[73] Assignee: Canon Kabushiki Kaisha, Tokyo, Japan

[21] Appl. No.: 618,920

[22] Filed: Oct. 2, 1975

Related U.S. Application Data

[63] Continuation-in-part of Ser. No. 460,075, April 11, 1974, abandoned.

[30] Foreign Application Priority Data

Apr. 17, 1973 Japan .................................. 48-45279
Apr. 17, 1973 Japan .................................. 48-45280

[51] Int. Cl.² .................... G03B 13/06; G03B 19/12
[52] U.S. Cl. ............................... 354/225; 354/155
[58] Field of Search ............. 354/155, 224, 225, 219, 354/152, 54, 55, 56

[56] References Cited

U.S. PATENT DOCUMENTS

| | | | |
|---|---|---|---|
| 3,250,196 | 5/1966 | Ot et al. | 354/219 |
| 3,524,380 | 8/1970 | Yamada | 354/224 |
| 3,675,558 | 10/1969 | Kuramoto | 354/155 |
| 3,687,038 | 8/1972 | Kawakami | 354/155 |
| 3,800,655 | 4/1974 | Uchida | 354/225 |
| 3,840,298 | 10/1974 | Ohuno | 354/155 |

FOREIGN PATENT DOCUMENTS

| | | | |
|---|---|---|---|
| 1,095,762 | 12/1967 | United Kingdom | 354/225 |
| 936,964 | 10/1963 | United Kingdom | 354/224 |

*Primary Examiner*—Edna M. O'Connor
*Attorney, Agent, or Firm*—Toren, McGeady and Stanger

[57] ABSTRACT

A view finder system for a single lens reflex camera which provides in the field of the finder an image of a photographic information indicator such as a distance adjusting ring, diaphragm adjusting ring and the like movably mounted in the lens barrel which is connected to the camera body. The view finder includes a pentagonal roof prism in combination with supplementary optical means optically connected thereto, said supplementary optical means comprising a sub-prism having an exit face cemented to the front non-reflecting face of the pentagonal roof prism, an entrance face and a reflecting face, and a mirror element spaced apart from the sub-prism. The mirror element is arranged above the sub-prism to face down optically both the indicator and the sub-prism, so that a light beam from the indicator is reflected by the mirror element to the sub-prism and thereby directed through the pentagonal roof prism to provide an image of the indicator in the field of finder.

10 Claims, 11 Drawing Figures

VIEW FINDER SYSTEM FOR A SINGLE LENS REFLEX CAMERA

CROSS REFERENCE TO COPENDING APPLICATION

This application is a continuation-in-part of our Patent Application Ser. No. 460,075 filed Apr. 11, 1974, now abandoned.

BACKGROUND OF THE INVENTION

This invention relates to a view finder system for a single-lens-reflex-camera of the type in which an image of the indicator mounted in the lens barrel which is connected to the camera body is provided in the field of the finder.

The presently proposed devices for providing views or images of various photographic informations in or outside the photographing image in the field of finders for photographic cameras may be considered to be divided into two main groups, one of which is composed mainly of mechanical means, the other is composed mainly of optical means. As far as the simplicity of structure is concerned, the latter is superior to the former. View finder systems of the later type and particularly adapted for use in single lens reflex cameras include a pentagonal roof prism in combination with supplementary optical means optically connected thereto by means of which an image of at least part of the photographic information indicator such as a distance adjusting ring, diaphragm adjusting ring and the like movably mounted in the lens barrel connected to the camera body is provided in the finder field of view. Such view finder systems are described, for example, in the German Pat. No. 1,196,493 and U.S. Pat. No. 3,014,911.

The view finder system of the German Pat. No. 1,196,493 issued March 31, 1966 includes a pentagonal roof prism in combination with supplementary optical means which comprise a pivoted mirror element arranged in front of the front reflecting face of the pentagonal roof prism, and a prism having areflecting face and arranged under said pivotably mirror element in alignment with said mirror and the scales carried on the lens barrel of the camera. Upon tilting of the mirror element at a predetermined angle, either of a scale carried on the lens barrel and a scale of an indicator mounted above the mirror element is selected to provide an image thereof in the finder image. The light rays reflected from the mirror element are allowed to directly enter the pentagonal roof prism at a half-mirrored portion of the front reflecting face which contributes to the formation of the finder image. As a result, the finder image of the view finder is darker in a portion corresponding to the half-mirrored area on the front reflecting face. Another disadvantage is that, because of a large angle which the reflecting face of the supplementary prism makes with respect to the horizontal, a considerable amount of light rays reflected from the area surrounding the scale are allowed to enter the view finder, causing the reading of the scale image to become difficult. In order to overcome the latter disadvantage, according to the identified patent, instead of the supplementary prism, a convex lens is employed as positioned directly above the scale carried on the lens barrel, thereby light rays from the scale are collected by the convex lens and the allowed to impinge on the mirror element. However, in this case, the finder housing extends largely toward the lens barrel side to create an alternative difficulty for the camera operator in viewing the selected indicium of the scale directly from outside.

The view finder described in the U.S. Pat. No. 3,094,911 issued June 25, 1963 is constructed as comprising a roof pentaprism provided with a sub-prism cemented either to the upper front face, or to the lower front face which contributes the formation of the finder image. The sub-prism has two reflecting faces disposed in such a manner that a beam of light rays from the indicia of the exposure condition adjusting components movably mounted in the lens barrel is reflected by one of the two to the other, and therefrom reflected to the interface between the sub-prism and the pentaprism. The beam entering the interface is directed through the pentaprism to the eye of the observer looking through the view finder. In this arrangement of the optical elements of the view finder, it is necessary to dispose the first and second reflecting faces of the subprism with high accuracy not only relative to each other, but also with respect to the roof pentaprism, or other wise the indicium image will not appear within a predetermined field of view relative to the finder field of view. In manufacturing sub-prisms having the specified surfaces and assembling a sub-prism with a roof pentaprism, therefore, the requirements for accuracy are rigorous in view of the incapability of, once the sub-prism has been cemented to the roof pentaprism, modifying the spatial and angular position of the first and second reflecting faces of the sub-prism. Further, in order to provide an image of portions of the indicia distributed over an increased area, it is necessary to increase the area of the first reflecting face of the sub-prism and consequently increase its volume, thereby preventing the size and weight of the view finder from being minimized, as long as the first reflecting face is arranged not to be movable.

The finder system described in the U.S. Pat. No. 3,800,655 applied on Dec. 14, 1972 and published on Apr. 2, 1974 has a pentagonal roof prism in which a V-shaped seat is provided between a front reflecting face and a front non-reflecting face, a sub-prism cemented to said V-shaped seat, and a mirror which optically faces said sub-prism and an indicator provided at a lens barrel. The light beam from the indicator is first reflected by the mirror and is directed to the sub-prism. The luminous flux from the indicator passing through the sub-prism is so reflected by the front reflecting face of the pentagonal roof prism as being directed to almost same direction as that of the luminous flux from a focusing screen. Therefore, it is necessary to provide a V-shaped seat through which said luminous flux passes at the pentagonal roof prism so that the luminous flux from the indicator impinges on the front reflecting face from almost same direction as that of the luminous flux from the focusing screen. Further, two reflecting planes, first and second, which face up or down respectively, need to be provided at the sub-prism for having the luminous flux from the indicator pass through the V-shaped seat along the above mentioned direction, also for increasing the optical path of said luminous flux. The first reflecting plane faces the above mentioned mirror while the second reflecting plane faces the first reflecting face of the pentagonal roof prism. And the first and second reflecting planes face to each other.

The greatest shortcoming of the finder system of U.S. Pat. No. 3,800,655 is complication of the shape of two prisms. The pentagonal roof prism has a V-shaped seat difficult to manufacture, also the sub-prism has a complicated shape and a large size. Therefore, manufacturing cost of such finder system is high.

SUMMARY OF THE INVENTION

An object of the invention is to provide a view finder system for a single lens reflex camera of the type in which an image of the photographic information indicator, for example, a distance adjusting ring, diaphragm adjusting ring and the like, movably mounted in the lens barrel connected to the camera body is provided in the field of view of the finder by means of supplementary optical means without damaging the finder image by incorporation of such supplementary optical means.

Another object of the invention is to provide a view finder system for a single lens reflex camera of the type described which is of compact structure.

Another object of the invention is to provide a view finder system for a single lens reflex camera of the type described of which the optical elements may be manufactured and assembled in moderate tolerances, and accordingly which is manufactured in low cost.

Still another object of the invention is to provide a view finder system for a single lens reflex camera of the type described which permits the selection of a desired photographic information indicator from a plurality of indicators, being positioned in a direction along the longitudinal direction of the lens barrel connected to the camera body to provides an image of at least part of the desired selected indicator in the finder field of view.

The view finder system for a single lens reflex camera constructed in accordance with the present invention includes a pentagonal roof prism, supplementary optical means and photographic information indicating means mounted in the lens barrel connected to the camera body. In a specific embodiment of the present invention, the supplementary optical means comprise a sub-prism and a mirror. Said sub-prism has an entrance face oriented upward, a reflecting face and an exit face cemented to the front non-reflecting face of said pentagonal roof prism. And said mirror is positioned above said sub-prism and oriented to optically face downward the sub-prism and the indicating means mounted in the lens barrel. A light beam from the indicating means is reflected by the mirror element to the sub-prism, and thereby directed directly in the direction of the exit face of pentagonal roof prism.

In such a finder system, although the mirror element and the sub-prism are optically connected with each other, they are not combined to form a single member, so that even if some error is produced in assembling the sub-prism with the pentaprism, the error can be readily compensated by later adjustment of the mirror element in spatial and angular position.

Also the degree of the freedom in the position at which the mirror element is provided. Therefore, the mirror element can be placed at a position sufficiently spaced apart from the lens barrel to make angle of the luminous flux impinging on the mirror from the indicating means against the longitudinal direction of the lens barrel close to 90°. In this case, the upper or lower portion of the indicator image will not be distorted nor the distance will be seen differently while the deterioration of the image caused by the reflection of external light at the surface of the lens barrel will be eliminated.

Further, the mirror element can be arranged to be tiltable about a predetermined axis, or displaceable in parallel to a predetermined direction, or movable in any fashion. Therefore, it is possible to increase the field which can be covered by the beam of light rays providing the parameter scale image by selecting a desired indicator from the plurality of indicators, which are provided at different positions along the longitudinal direction of the lens barrel connected to the camera body, in spite of the small reflecting surface area of the mirror element. Further, to impart a satisfactory performance to the view finder system of the present invention, the sizes of the sub-prism and mirror element are not necessarily increased, thereby giving an advantage of facilitating the minimization of the size of the view finder. Also the sub-prism and the pentagonal prism have simple shape and can be easily manufactured and the manufacturing cost of the finder system is low. And the sub-prism is seated on the front non-reflecting face which is not in the path of light rays forming the photographing image, so that the quality of the finder image is not reduced by the incorporation of such supplementary optical means.

Figure 1:
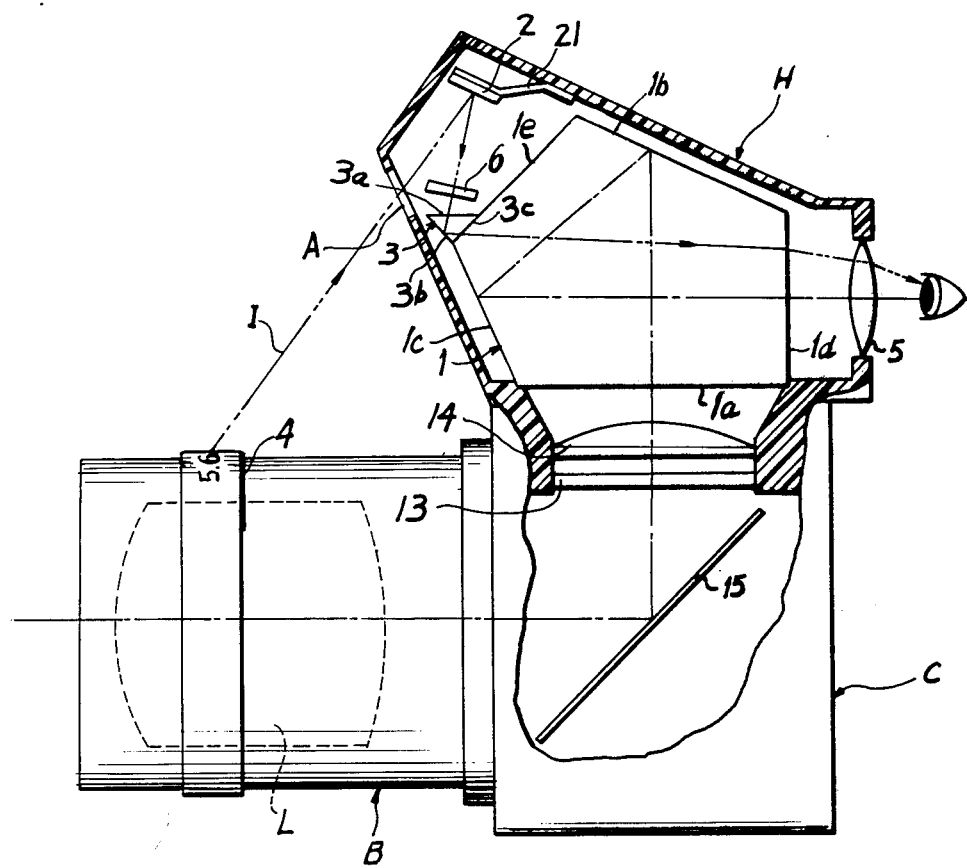
FIG. 1 is a schematic side elevational view of an embodiment of the view finder system according to the present invention.

DESCRIPTION OF THE PREFERRED EMBODIMENTS:

Referring to FIG. 1, there is shown the basic elements of a view finder system for a single lens reflex camera in accordance with an embodiment of the present invention.

A pentagonal roof prism 1 is placed within a housing H being provided on a camera body C and having an opening A in such manner that a bottom face 1a opposes to a focusing screen 13. An image to be photographed is formed at the focusing screen 13, through a mirror 15, which jumps up by a mirror-up mechanism not being shown in the drawing as a shutter is opened, by an objective lens L being provided within a lens barrel B being attached to front end of the camera body C by a bayonet mechanism, etc.

Light from the image on the screen 13 is radiated upward through a condenser lens 14 into the bottom face 1a of the pentaprism 1. The light providing the finder image and entering the bottom face 1a is reflected from the two roof faces 1b of the pentaprism 1 and the front reflecting face 1c thereof, and thereby directed through the exit face 1d of the pentaprism 1 to an eyepiece 5, reaching the eye of a camera operator looking through the finder. Fixedly positioned on the front non-reflecting face 1e of the pentaprism 1 is a sub-prism 3 having an exit face 3c cemented thereto and forming an interface therewith, an entrance face 3a oriented upward and a reflecting face 3b. Such a prism 3 is preferably of small size and volume. A mirror 2 which is separated from the prism 3 is arranged above the sub-prism 3 and mounted on the supporting member 21 fixed to the housing H. A photographic information indicator 4, for example, a distance adjusting ring, a diaphragm adjusting ring, being mounted on the lens barrel B is placed at the front lower position of the front non-reflecting face 1e of the pentagonal roof prism 1. Therefore, the mirror 2 faces downward opposing to the sub-prism 3 and the indicator 4. (Here, upward direction as referred to in this specification means such direction as proceeding from the bottom face to the roof face or the front non-reflecting face in the pentagonal roof prism, while a downward direction means a direction reverse thereto. Also, a forward direction means a direction proceeding from the exit face to the front reflecting face or the front non-reflecting face in the pentagonal roof prism, while rearward direction means a direction reverse thereto).

In such an arrangement shown in FIG. 1, light beam I from the ring 4 is reflected by the mirror 2 to the sub-prism 3. The beam entering the entrance face 3a of prism 3 is reflected from the reflecting face 3b to the interface or cemented area 3c between the prisms 1 and 3, and directed directly to the exit face 1d of the pentaprism 1 to reach the upper margin of the eye-piece 5, providing the image of the indicator 4 in the field of the finder. In order to increase the size of the indicium image field provided by the supplementary prism and mirror, a concave lens 6 may be arranged in the path of the beam between the mirror 2 and the prism 3 as shown in FIG. 1 or between the mirror 2 and the indicator 4. As has been already mentioned, the mirror 2 and the prism 3 are separated from each other which accommodate with two reflecting faces the supplementary optical means directing the beam from the indicator 4 through the pentaprism. Therefore, when a camera is assembled the positions and orientations of the mirror 2 and the sub-prism 3 can be adjusted individually. For example, in FIG. 1 the position and the orientation of the mirror 2 can be suitably selected by adjusting the position at which the member 21 is assembled to the housing H and the way said member 21 is bent. While an orientation fine adjustment mechanism for a mirror facing an indicator at the time of camera assembly is illustrated in FIG. 14, FIG. 15 of the specification of British Pat. No. 1,095,762, such mechanism may be applied to the example shown in FIG. 1. Therefore, even if the prism 3 is cemented to the pentaprism 1 with a low accuracy such that the path of the indicium-bearing beam in the pentaprism is deviated from the intended path, the deviation can be eliminated by a fine adjustment of the mirror. Further, the mirror 2 and prism 3 are arranged to be spaced from each other, so that it is possible to locate an additional optical means such as a concave lens 6 in a space therebetween. For making the size of the finder system small, it is preferred that the mirror 2 is of small size and is positioned as near the prism 1 as possible.

Figure 2A:
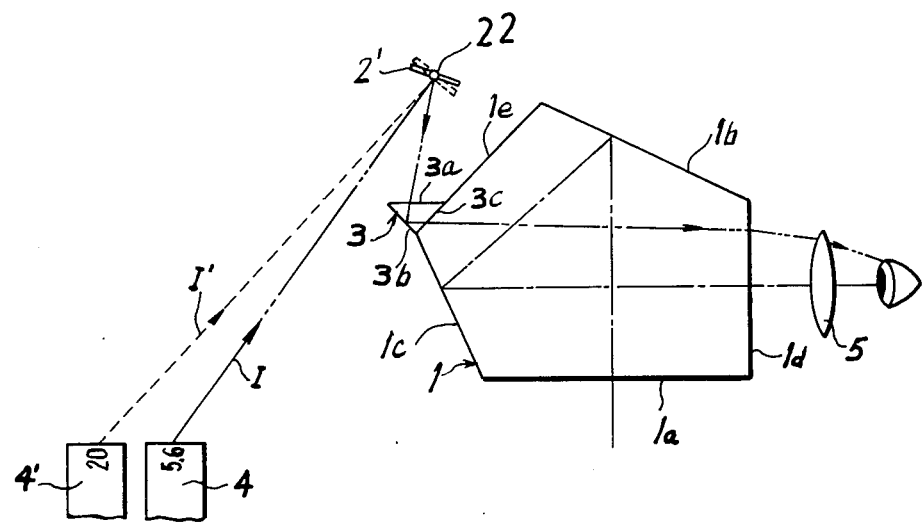
FIG. 2A and FIG. 2B are schematic diagrams of other example of the present invention.

In the example of FIG. 2A, two indicators 4, 4' being placed at different positions of a same lens barrel are shown. (As the inter-relationship among a camera body, a housing, a lens barrels, etc. is same as that in FIG. 1, they are omitted from FIG. 2A. All or portion of said components will be omitted in the drawings to be shown below to avoid troublesomeness).

Figure 2B:
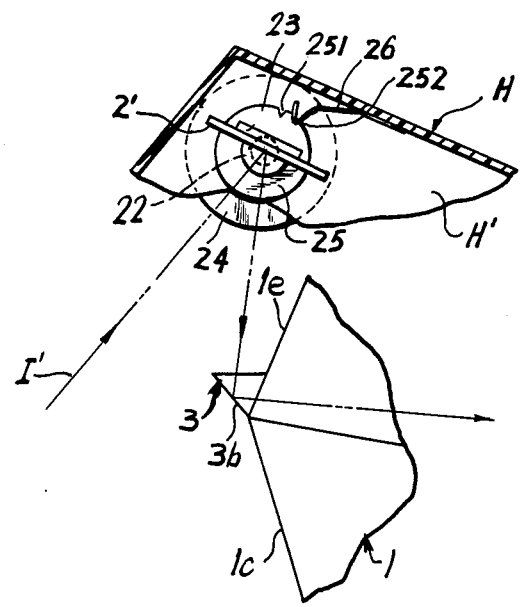

The view finder system is illustrated as including a tiltable mirror 2' mounted on a certain pivot pin 22 in a mirror mount shown in FIG. 2B. It is preferred that the axis of the pivot pin is contained in the mirror plane and is orthogonal to the direction of the beam I, I' from the indicator 4, 4' incident thereon as well as parallel to the reflecting face of the prism 3. So long as the mirror 2' is set in an operative position indicated at the solid lines, the beam I from a ring 4 is reflected by the mirror 2' and directed in a predetermined path to the prism 3. So long as the mirror 2' is set in another operative position indicated at the dash lines, the beam I' from a different ring 4' is reflected by the mirror 2' and thereby directed in the same path to the prism 3. Therefore, setting the mirror 2' in different operative angular positions in sequence, the camera operator can view an image of indicium on different rings in sequence.

FIG. 2B shows an easily understandable example of the above mentioned pivot pin mechanism which has the mirror 2' selectively face each of the indicators 4, 4' provided at different locations of a same lens barrel. The mirror 2' is cemented to a mirror holding plate 23. A pivot pin 22 is attached to the plate 23 in such manner that the pin axle is placed on the mirror plane of the mirror 2'. Said pivot pin 22 is supported at a bearing hole perforated at a side plate H' of the housing H. And an adjustment knob 24 which is located outside of the housing is fixed to one end of said pivot pin 22, and a disk 25 having dents 251, 252 being notched with such spacing as corresponding to the spacing for the indicators 4, 4' is fixed between the side plate H' and the mirror 2'. A forward end projection part of a plate spring stopper 26 fixed at the housing H is pressed against the circumferential plane of the disk 25. As a camera operator rotates the knob 24 the rotation of the mirror 2' is stopped at such angles that the said forward end projection part of the stopper 26 drops into the dents 251, 252 of the disk 25, respectively. When the stopper 26 is checked by the dent 251 the mirror 2' reflects the beam I from the indicator 4 toward the reflecting face 3b of the sub-prism 3, while when the stopper 26 is checked by the dent 251 the mirror 2' reflects the beam I' from the indicator 4' toward said reflecting face 3b.

Figure 3:
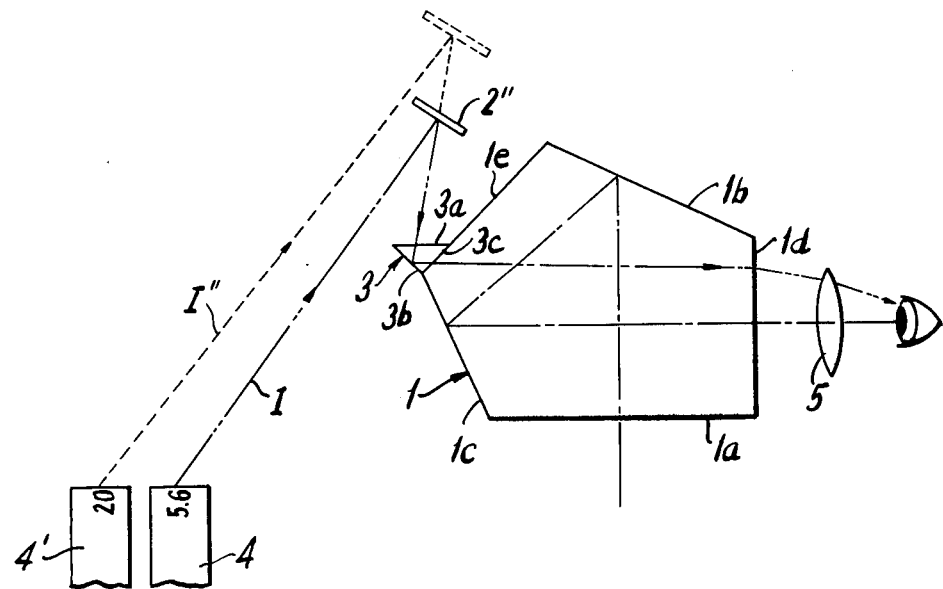
FIG. 3 is a schematic diagram of further other example of the present invention.

In another example shown in FIG. 3, a mirror 2" is arranged to be displaceable in parallel to a predetermined direction. It is preferred that the displacement direction is parallel to the path of the beam reflected from the mirror 2". So long as the mirror 2" is set in an operative position indicated by the solid lines, the beam I from a ring 4 is permitted to enter the sub-prism 3. So long as the mirror 2" is set in another operative position indicated at the dash lines, the beam I' from a different ring 4' is permitted to enter the prism 3. Therefore, setting the mirror 2" in different operative positions, the camera operator can view an image of desired indicium on different rings in sequence.

Figure 4A:
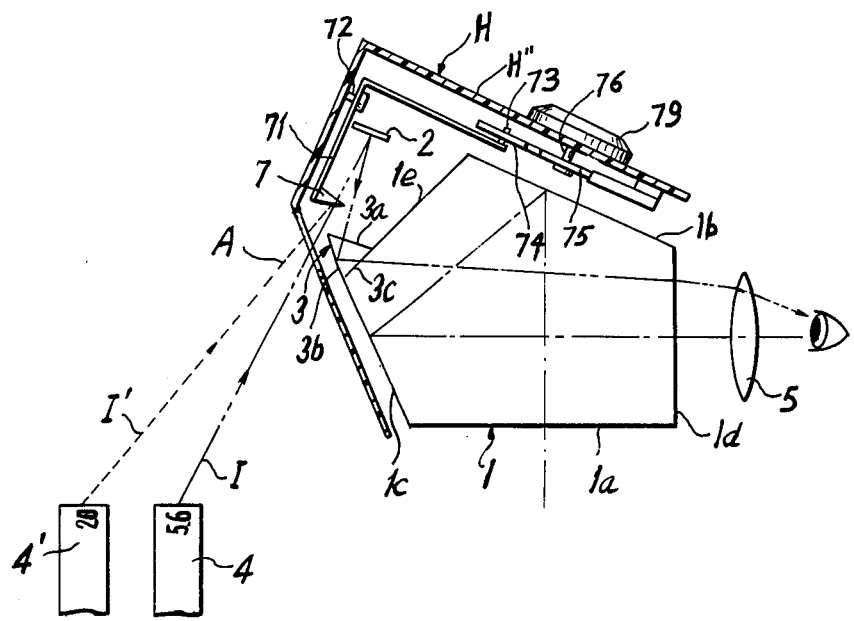
FIG. 4A and FIG. 4B are schematic diagrams of still other example of the present invention.
Figure 4B:
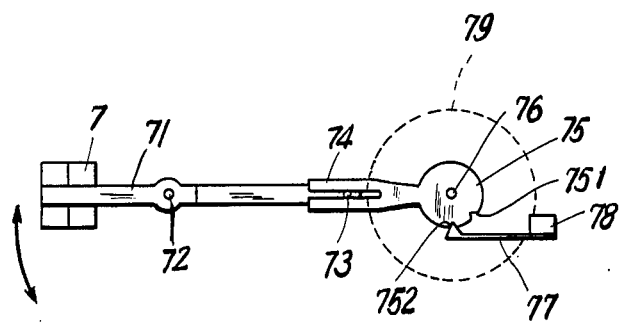

A finder system shown in FIG. 4A can also have images of the two indicators 4, 4' selectively displayed at the field of the finder. This finder system has a wedge-shaped deflector prism 7 which is shifted across the optical path between the mirror 2 and the indicators 4, 4' and has such deflection power (of wedge angle, being determined by refractive index) as corresponding to the space between the indicators 4, 4'. The wedge 7 is cemented to one end of a L-shaped member 71 being rotatably attached by an axle 72 to an upper plate H" of the housing H as the wedge-supporting member. Also a pin 73 is planted at the other end of the member 71. A long groove of an arm 74 projecting from a disk 75 slidably engages with the pin 73. Also dents 751, 752 are notched at the circumferential part of the disk 75 as shown in FIG. 4B. And a plate spring stopper 77 fixed on the upper plate H" through a fixing member 78 is pressed against the circumferential part of said disk 75 so that the projection part can drop into the above mentioned dents 751, 752. The disk 75 has one end of the axle 76 being fixed thereto while an adjustment knob 79 is fixed at the other end of the axle 76. And the axle 76 is supported at a bearing hole perforated at the upper plate H". As a camera operator rotates the knob 79, the L-shaped member 71 swings to left and right around the axle 71. When the projection part of the stopper 77 drops into the groove 752 of the disk 75, the wedge 7 is stopped at the position where it enters into the above mentioned optical path, and when the projection part drops into the groove 751, the wedge 7 is stopped at the position where it goes out of said optical path. At the former position the wedge 7 deflects the luminous flux I' from the indicator 4' to have it impinge on the mirror 2, and the mirror 2 has said luminous flux pointed to the reflecting face 3b of the subprism 3. When the wedge 7 is at the latter position, the luminous flux I from the indicator 4 impinges directly on the mirror 2, then is reflected thereby and is pointed to the reflecting face 3b of the sub-prism 3. Therefore, inserting or removing the wedge 7 into or from the path of light rays incident upon the mirror, the camera operator can see an image of indicium on a different ring 4 or 4' alternatively. Also the wedge 7 may be so provided as entering into and coming out of the optical path between the mirror 2 and the sub-prism 3 by a similar mechanism as that shown in FIG. 4A, FIG. 4B.

The finder system explained in FIGS. 2A, 3, 4A is to select a desired one out of plural number of indicators showing different kinds of information being provided at different locations along the longitudinal direction of a same lens barrel for forming the image thereof within the field of the finder. Now various lens barrels may be connected to a camera body in a single lens reflex camera. And depending on the different kinds of the lens barrels the distance from the camera body to the position of an indicator showing one information for example a diaphragm aperture adjusting ring will be different, thus the distance from the pentagonal prism will be different. A finder system as has been explained in FIG. 2A, FIG. 3 and FIG. 4 can be applied for reading out the same kind of information from various lens barrels. That is, the distance between the grooves 251, 252 on the disk 25 in FIG. 2B, or the deflection power of the wedge prism in FIG. 4A may be made to correspond to the above mentioned kinds of the lens barrel. Thus, even if different kinds of lens barrels are connected to the camera body and same kinds of indicators are positioned at different distances from the pentagonal prism, always the images of the same kind of indicators can be formed within the field of the finder by tilting the mirror, shifting the mirror in parallel direction, or making the wedge prism enter into or come out of the above mentioned optical path. Thus, the plural number of indicators being mounted at different positions along longitudinal direction of the lens barrel connected to the camera body in this specification means not only the indicators mounted on a same lens barrel but also the indicators mounted on different lens barrels. What is common to both cases is, regardless the kinds of plural number of indicators whether they are same or different, that they are provided at the lens barrel connected to the camera body and that the distance to each indicator from the pentagonal roof prism will be different.

Figure 5:
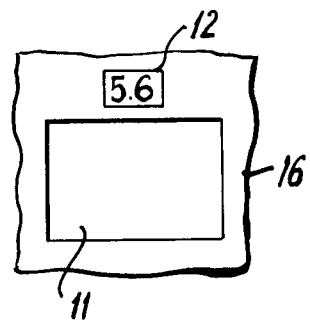
FIG. 5 is a view appearing in the view finders of FIGS. 1 through 4A and 8.

The weight and bulk of the view finder according to the present invention can be reduced to a satisfactory level, provided that the mirror 2, 2', 2", prism 3, wedge prism 7 and their supporting members are of small volume and size, and are arranged adjacent the roof pentaprism. In the examples shown in FIGS. 1, 2A, 3 and 4A, the arrangement of the supplementary optical means causes the beam from the indicator entering the roof pentaprism 1 to emanate at the upper margin of the exit face 1d thereof, so that an image of an indicium on the ring 4 or 4' appears within an image field 12 near the upper side of the image field of the photographed object 11 in the field of the finder 16 as indicated in FIG. 5.

Figure 6:
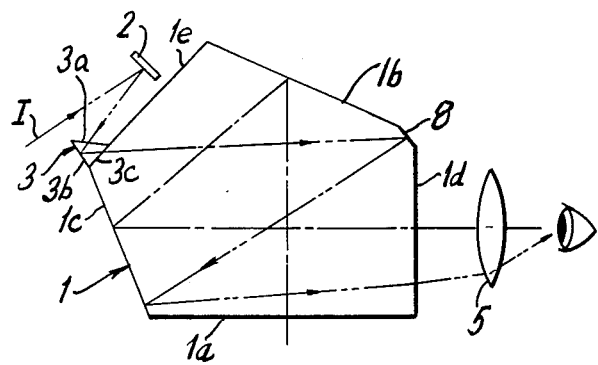
FIG. 6 is a schematic side elevational view of still another embodiment of the view finder according to the present invention.
Figure 9:
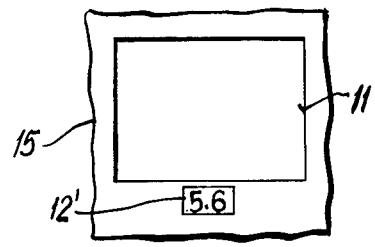
FIG. 9 is a view appearing in the view finders of FIGS. 6 and 7.

In still another embodiment of the invention shown in FIG. 6, there is employed a roof pentaprism 1' provided with a rear reflecting face 8 facing the front reflecting face 1c and intersecting with the exit face 1d and two roof faces 1b thereof. The rear reflecting face 8 has an area sufficient to permit an image of an indicium on the ring 4 or 4' to appear in the finder field of view. But an increased area of the face will reduce the quality of the finder image. The beam I entering the interface is directed through the pentaprism 1 to the rear reflecting face 8, and therefrom reflected to the front reflecting face 1c, from which it is then reflected to the lower margin of the exit face 1d of the pentaprism 1'. In this example, the indicium image appears within an image field 12' near the lower side of the finder image of the photographed object 11 in the finder field 15, as indicated in FIG. 9.

By provision of a rear reflecting face, it is possible to increase the optical path length between the indicator and the eye-piece.

The pentagonal roof prism 1' shown in FIG. 6 can be used in any one of the finder systems shown in FIG. 1, FIG. 2A, FIG. 3 and FIG. 4A.

Figure 7:
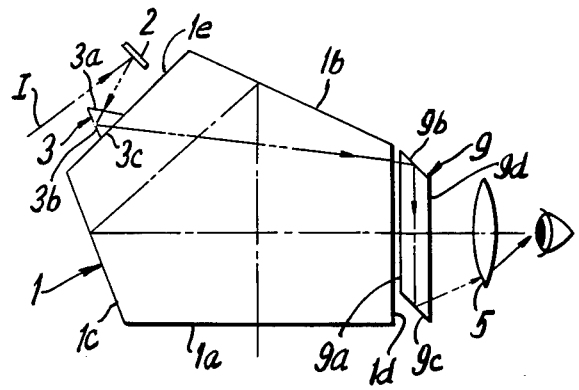
FIGS. 7 and 8 are schematic side elevational views of examples of the view finder including supplementary optical means according to a further embodiment of the present invention.
Figure 8:
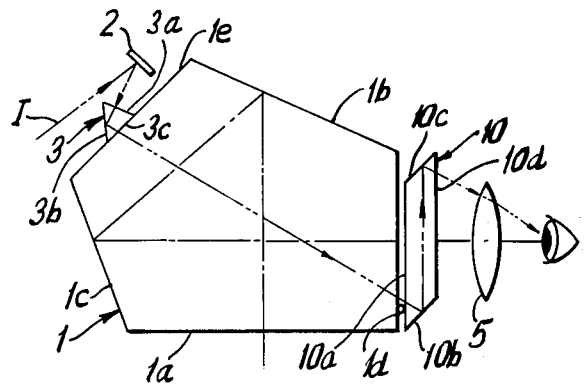

In examples of a further embodiment shown in FIGS. 7 and 8, a second supplementary prism 9 and 10 is positioned adjacent the exit face 1d of the roof pentaprism 1, or it may be cemented thereto.

In the example shown in FIG. 7, the prism 9 has an entrance face 9a facing the exit face of the prism 1, an upper reflecting face 9b, a lower reflecting face 9c and an exit face 9d facing the eye-piece 5, and is disposed with the upper reflecting face 9b optically facing the interface between the prisms 1 and 3.

The beam I entering the interface is directed through the pentaprism 1 to the upper reflecting face 9b of the prism 9, and thereby reflected to the lower reflecting face 9c and therefrom reflected to the eye-piece 5. In this example, the indicium image appears near the lower side of the finder image of photographed object 11 in the field of the finder 15 as indicated in FIG. 9.

In the example shown in FIG. 8, the prism 10 has an entrance face 10a facing the exit face 1d of prism 1, a lower reflecting face 10b, an upper reflecting face 10c and an exit face 10d facing the eye-piece, and is disposed with the lower reflecting face 10b optically facing the interface between the prisms 1 and 3.

The beam I entering the interface is directed through the pentaprism 1 to the lower reflecting face 10b of the prism 10 and therefrom reflected to the upper reflecting face 10c, and therefrom reflected to the eye-piece 5. In this case, the indicium image appears near the upper side of the image of photographed object 11 in the field of the finder 15 as indicated in FIG. 5. By arranging a second sub-prism as mentioned above, it is possible to increase the optical path length from the indicator to the eye-piece.

The second sub-prism shown in FIGS. 7 and 8 may be used in any one of the finder systems shown in FIGS. 1, 2A, 3 and 4A.

The different embodiments shown by way of example in FIGS. 1 - 4A and 6 - 8 are adapted for different arrangement, construction and form of the view finder housing, lens barrel, camera body and other components incorporated in a single lens reflex camera. Since certain changes may be made in the above view finders for single lens reflex cameras without departing from the scope of the invention herein involved, it is intended that all matter contained in the above description or shown in the accompanying drawing shall be interpreted as illustrative and not in a limiting sence

What is claimed is:

1. A view finder system for a single lens reflex camera associated with a lens barrel having an objective lens and photographic information indicating means mounted thereon, comprising:
   a focusing screen on which an image of an object to be photographed is formed by said objective lens;
   an eye-piece
   a pentagonal roof prism having a bottom face optically facing said focusing screen, two roof faces, a front reflecting face, an exit face optically facing said eye-piece and a front non-reflecting face, and directing light from said focusing screen to said eye-piece to provide the image of the object in a field of the finder;
   a sub-prism having a single entrance face, a single reflecting face and a single exit face cemented to a lower portion of the front non-reflecting face of said pentagonal roof prism, wherein said entrance face faces upward; and
   a mirror optically facing both the indicating means and the entrance face of the sub-prism, said mirror being located above said indicating means and said sub-prism and arranged so that a light beam from said indicating means incident upon the mirror is thereby directed through the entrance face to the reflecting face of said sub-prism and also thereby directed through the exit face of said sub-prism cemented to the front non-reflecting face of said pentagonal roof prism directly in a direction of an upper portion of said eye-piece to provide an image of said indicating means in the field of the finder.

2. A view finder system for a single lens reflex camera associated with a lens barrel having an objective lens and a plurality of photographing information indicators mounted thereon in different locations, comprising:
   a focusing screen on which an image of an object to be photographed is formed by said objective lens;
   an eye-piece;
   a pentagonal roof prism having a bottom face optically facing said focusing screen, two roof faces, a front reflecting face, an exit face optically facing said eye-piece and a front non-reflecting face, and directing light from said focusing screen to said eye-piece to provide the image of the object in a field of the finder;
   a sub-prism having an entrance face, a reflecting face and an exit face cemented to the front non-reflecting face of said pentagonal roof prism, wherein said entrance face faces upward;
   a mirror positioned above said indicators and said sub-prism, and optically facing the entrance face of said sub-prism; and
   means for moving said mirror which supports said mirror in a tilted manner so that the angle of the mirror is varied stepwise to face a desired one of said indicators, so that a light beam from the desired indicator incident upon the mirror is thereby directed through the entrance face to the reflecting face of said sub-prism and thereby directed through the exit face of said sub-prism cemented to the front non-reflecting face of said pentagonal roof prism directly in a direction of the exit face of said pentagonal roof prism to provide an image of the desired indicator in the field of the finder.

3. A view finder system for a single lens reflex camera according to claim 2, including a second sub-prism located in an optical path between said pentagonal roof prism and said eye-piece, wherein said second sub-prism has an entrance face optically facing the exit face of said pentagonal roof prism, an exit face optically facing said eye-piece, and upper and lower reflecting faces and is so arranged that the light beam from said indicator entering the second sub-prism is first reflected from the upper reflecting face to the lower reflecting face and reflected therefrom to a lower portion of said eye-piece.

4. A view finder system for a single lens reflex camera according to claim 2, including a second sub-prism located in an optical path between said pentagonal roof prism and said eye-piece, wherein said second sub-prism has an entrance face optically facing the exit face of said pentagonal roof prism, an exit face optically facing said eye-piece, and lower and upper reflecting faces and is arranged that the light beam from said indicator entering the second sub-prism is first reflected from the lower reflecting face to the upper reflecting face and reflected therefrom to an upper portion of said eye-piece.

5. A view finder system for a single lens reflex camera associated with a lens barrel having an objective lens and a plurality of photographic information indicators mounted thereon in different locations, comprising:
   a focusing screen on which an image of an object to be photographed is formed by said objective lens;
   an eye-piece
   a pentagonal roof prism having a bottom face optically facing said focusing screen, two roof faces, a front reflecting face, an exit face optically facing said eye-piece and a front non-reflecting face, and directing light from said focusing screen to said eye-piece to provide the image of the object in a field of the finder;
   a sub-prism having an entrance face, a reflecting face and an exit face cemented to the front non-reflecting face of said pentagonal roof prism, wherein said entrance face faces upward;
   a mirror positioned above said indicators and said sub-prism, and optically facing the entrance face of said sub-prism;
   a deflector prism; and
   means for moving said deflector prism across an optical path between said sub-prism and the indicators so as to selectively direct a light beam from a desired indicator to said mirror, so that the light beam from the desired indicator incident upon the mirror is directed through the entrance face to the reflecting face of said sub-prism and also directed through the exit face of said sub-prism cemented to the front non-reflecting face directly in the direction of the exit face of said pentagonal roof prism to provide an image of the desired indicator in the field of the finder.

6. A view finder system for a single lens reflex camera according to claim 5, including a second sub-prism located in an optical path between said pentagonal roof prism and said eye-piece, wherein said second sub-prism has an entrance face optically facing the exit of said pentagonal roof prism, an exit face optically facing said eye-piece, and upper end lower reflecting faces and is so arranged that the light beam from said indicator entering the second sub-prism is first reflected from the upper reflecting face to the lower reflecting face and reflected therebetween to a lower portion of said eye-piece.

7. A view finder system for a single lens reflex camera according to claim 5, including a second sub-prism located in an optical path between said pentagonal roof prism and said eye-piece, wherein said second sub-prism has an entrance face optically facing the exit face of said pentagonal roof prism, an exit face optically facing said eye-piece, and lower and upper reflecting faces and so so arranged that the light beam from said indicator entering the second sub-prism is first reflected from the lower reflecting face to the upper reflecting face and reflected therefrom to an upper portion of said eye-piece.

8. A view finder system for a single lens reflex camera associated with a lens barrel having an objective lens and photographic information indicating means mounted thereon, comprising:
  a focusing screen on which an image of an object to be photographed is formed by said objective lens;
  an eye-piece;
  a penta-prism-type reflection prism having a bottom face optically facing said focusing screen, two roof faces, a front reflecting face, an exit face optically facing said eye-piece and a front non-reflecting face, and directing light from said focusing screen to said eye-piece to provide the image of the object in the field of the finder, said penta-prism-type reflection prism further having a rear reflecting face being located at a rear portion of the penta-prism-type reflection prism and facing both the front non-reflecting face and the front reflecting face;
  auxiliary optical means optically coupled to the front non-reflecting face of said penta-prism-type reflection prism, said auxiliary optical means facing said indicating means and directing a light beam from said indicating means through the front non-reflecting face directly to the rear reflecting face of said penta-prism-type reflection prism so that the light incident upon the rear reflecting face is therefrom reflected to the front reflecting face and therefrom reflected to the exit face of said penta-prism-type reflection prism to provide an image of said indicating means in the field of the finder.

9. A view finder system for a single lens reflex camera according to claim 8, wherein said auxiliary optical means includes a sub-prism cemented to the front non-reflecting face of said penta-prism-type reflection prism for reflecting the light beam to the rear reflecting face of said penta-prism-type reflection prism, and a mirror optically facing said indicating means and the sub-prism and reflecting the light beam from the indicating means to the sub-prism.

10. A view finder system for a single lens reflex camera according to claim 9, wherein said sub-prism has a single entrance face facing upward, a single reflecting face and a single exit face cemented to the front non-reflecting face of said penta-prism-type reflection prism, and said mirror is positioned above the sub-prism.

* * * * *